US012098235B2

(12) United States Patent
Smith et al.

(10) Patent No.: US 12,098,235 B2
(45) Date of Patent: Sep. 24, 2024

(54) FOAMED ISOCYANATE-BASED POLYMER

(71) Applicant: Proprietect L.P., Toronto (CA)

(72) Inventors: Derrick William Smith, Toronto (CA); Thomas Robert Beamish, Oakville (CA); Paul David Hurrell, Palgrave (CA)

(73) Assignee: Proprietect L.P., Toronto (CA)

( * ) Notice: Subject to any disclaimer, the term of this patent is extended or adjusted under 35 U.S.C. 154(b) by 0 days.

(21) Appl. No.: 15/637,792

(22) Filed: Jun. 29, 2017

(65) Prior Publication Data

US 2018/0002478 A1  Jan. 4, 2018

Related U.S. Application Data

(60) Provisional application No. 62/493,304, filed on Jun. 29, 2016.

(51) Int. Cl.
| | | |
|---|---|---|
| *C08G 18/06* | (2006.01) | |
| *C08G 18/08* | (2006.01) | |
| *C08G 18/16* | (2006.01) | |
| *C08G 18/32* | (2006.01) | |
| *C08G 18/40* | (2006.01) | |
| *C08G 18/42* | (2006.01) | |
| *C08G 18/48* | (2006.01) | |
| *C08G 18/65* | (2006.01) | |
| *C08G 18/66* | (2006.01) | |
| *C08G 18/76* | (2006.01) | |
| *C08J 9/04* | (2006.01) | |
| *C08J 9/35* | (2006.01) | |
| *C08K 3/04* | (2006.01) | |
| *C08K 7/16* | (2006.01) | |
| *C08L 75/04* | (2006.01) | |

(52) U.S. Cl.
CPC ....... *C08G 18/0876* (2013.01); *C08G 18/163* (2013.01); *C08G 18/4247* (2013.01); *C08G 18/6523* (2013.01); *C08G 18/7607* (2013.01); *C08L 75/04* (2013.01); *C08G 2110/0008* (2021.01)

(58) Field of Classification Search
CPC .............. C08G 18/0876; C08G 18/163; C08G 18/3275; C08G 18/4247; C08G 18/4837; C08G 18/6523; C08G 18/6688; C08G 18/7607; C08G 18/7621; C08G 2101/0008; C08K 2201/005; C08K 2201/006; C08L 75/05
See application file for complete search history.

(56) References Cited

U.S. PATENT DOCUMENTS

| | | | | |
|---|---|---|---|---|
| 5,254,597 A | * | 10/1993 | Horn | ............ C08G 18/12 264/45.4 |
| 2002/0037942 A1 | * | 3/2002 | Takashima | ............ C08J 9/0066 521/82 |
| 2005/0245627 A1 | | 11/2005 | Takashima | |
| 2009/0007484 A1 | | 1/2009 | Smith | |
| 2016/0053078 A1 | * | 2/2016 | Dubey | ............ C08J 9/0085 264/331.16 |
| 2016/0200855 A1 | * | 7/2016 | Casati | ............ C08G 18/4883 521/137 |
| 2017/0058075 A1 | * | 3/2017 | Kumar | ............ C08G 18/7621 |

FOREIGN PATENT DOCUMENTS

| | | |
|---|---|---|
| CA | 2770919 A1 | 2/2011 |
| CN | 1673246 A | 9/2005 |
| CN | 101333281 A | 12/2008 |

(Continued)

OTHER PUBLICATIONS

The extended European search report, including the supplementary European search report, dated Jan. 28, 2020, in European application No. EP 17818784.5 (18 pages).
Richard, S. et al., "Influence of particle size and particle loading on mechanical and dielectric properties of biochar particulate-reinforced polymer nanocomposites", International Journal of Polymer Analysis and Characterization, (Mar. 21, 2016), vol. 21, No. 6, pp. 462-477, XP055448041 [A] 1-208.

*Primary Examiner* — Melissa A Rioja

(74) *Attorney, Agent, or Firm* — McAndrews, Held & Malloy, Ltd.; Michael S. Tomsa

(57) ABSTRACT

There is described a foamed isocyanate-based polymer derived from a reaction mixture comprising: an isocyanate; a polyol composition comprising a first prescribed amount of polymer particles dispersed in a base polyol; a second prescribed amount of biomass-based carbonaceous particulate material; and a blowing agent. In one embodiment, the foamed isocyanate-based polymer having an Indentation Force Deflection when measured pursuant to ASTM D3574-11 which is within about 15% as that of a reference foam produced by omitting the biomass-based carbonaceous particulate material from the reaction mixture and increasing the amount of polymer particles in the polymer polyol composition to equal the sum of the first prescribed amount and the second prescribed amount. In another embodiment, the foamed polymer has a cellular matrix comprising a plurality of interconnected struts, the biomass-based carbonaceous particulate material conferring to the cellular matrix a load efficiency of at least about 5 Newtons/weight % of biomass-based carbonaceous particulate material. A process to produce the foamed isocyanate-based polymer is also described. A polyol-based dispersion to produce the foamed isocyanate-based polymer is also described. It has been discovered that a relatively expensive petroleum-based copolymer polyol can be fully substituted by a relative inexpensive bio-based (amorphous carbon) dispersion with no significant compromise in important physical properties in the resulting polyurethane foam.

20 Claims, No Drawings

(56) References Cited

FOREIGN PATENT DOCUMENTS

| | | |
|---|---|---|
| CN | 101619165 A | 1/2010 |
| CN | 101935450 A | 1/2011 |
| CN | 102226035 A | 10/2011 |
| CN | 102443260 A | 5/2012 |
| CN | 102850503 A | 1/2013 |
| CN | 102911333 A | 2/2013 |
| CN | 103250581 A | 8/2013 |
| CN | 103275291 A | 9/2013 |
| CN | 103483523 A | 1/2014 |
| CN | 203655391 U | 6/2014 |
| CN | 104341770 A | 2/2015 |
| CN | 104725831 A | 6/2015 |
| CN | 104987485 A | 10/2015 |
| CN | 105461879 A | 4/2016 |
| CN | 105461885 A | 4/2016 |
| CN | 105504199 A | 4/2016 |
| CN | 105504341 A | 4/2016 |
| EP | 3202806 A1 | 3/2016 |
| JP | 08183905 | 7/1996 |
| JP | 10165260 | 6/1998 |
| JP | 10292104 | 11/1998 |
| JP | 11043611 | 2/1999 |
| JP | 2000273231 | 10/2000 |
| JP | 2001302752 | 10/2001 |
| JP | 2002-114904 A | 4/2002 |
| JP | 2004263116 | 9/2004 |
| JP | 2005306993 | 11/2005 |
| KR | 20010078866 A | 8/2001 |
| KR | 20030096169 A | 12/2003 |
| KR | 10-2004-0089224 A | 10/2004 |
| KR | 10-2005-0015551 A | 2/2005 |
| KR | 10-2005-0108846 A | 11/2005 |
| KR | 10-2008-0066116 A | 7/2008 |
| KR | 20090106689 A | 10/2009 |
| WO | 2014/168633 A1 | 10/2014 |
| WO | 2015035068 A1 | 3/2015 |
| WO | 2015193335 A1 | 12/2015 |

\* cited by examiner

FOAMED ISOCYANATE-BASED POLYMER

CROSS-REFERENCE TO RELATED APPLICATION

The present application claims the benefit under 35 U.S.C. § 119(e) of provisional patent application Ser. No. 62/493,304, filed Jun. 29, 2016, the contents of which are hereby incorporated by reference.

BACKGROUND OF THE INVENTION

Field of the Invention

In one of its aspects, the present invention relates to a foamed isocyanate-based polymer having improved properties. In another of its aspects, the present invention relates to a process for the production of such a foamed isocyanate-based polymer. In yet another of its aspects, the present invention relates to a method for improving the characteristics of an isocyanate-based foam. In yet another of its aspects, the present invention relates to a polyol-based dispersion useful, inter alia, for the production of a foamed isocyanate-based polymer.

Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mould the polymer while it is forming and expanding.

One of the conventional ways to produce a polyurethane foam is known as the "one-shot" technique. In this technique, the isocyanate, a suitable polyol, a catalyst, water (which acts as a reactive "blowing" agent and can optionally be supplemented with one or more physical blowing agents) and other additives are mixed together at once using, for example, impingement mixing (e.g., high pressure). Generally, if one were to produce a polyurea, the base polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g., isocyanate moieties and active hydrogen moieties). To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

Regardless of the technique used, it is known in the art to include a filler material in the reaction mixture. Conventionally, filler materials have been introduced into foamed polymers by loading the filler material into one or both of the liquid isocyanate and the liquid active hydrogen-containing compound (i.e., the base polyol in the case of polyurethane, the polyamine in the case of polyurea, etc.). Generally, incorporation of the filler material serves the purpose of conferring so-called loaded building properties to the resulting foam product.

The nature and relative amounts of filler materials used in the reaction mixture can vary, to a certain extent, depending on the desired physical properties of the foamed polymer product, and limitations imposed by mixing techniques, the stability of the system and equipment imposed limitations (e.g., due to the particle size of the filler material being incompatible with narrow passages, orifices and the like of the equipment).

One known technique of incorporating a solid material in the foam product for the purpose of improving hardness properties involves the use of a polyol-solids dispersion, particularly one in the form of a graft copolymer polyol. As is known in the art, graft copolymer polyols are polyols, preferably polyether polyols, which contain other organic polymers. It is known that such graft copolymer polyols are useful to confer hardness (i.e., load building) to the resultant polyurethane foam compared to the use of polyols which have not been modified by incorporating the organic polymers. Within graft copolymer polyols, there are two main categories which may be discussed: (i) chain-growth copolymer polyols, and (ii) step-growth copolymer polyols.

Chain-growth copolymer polyols generally are prepared by free radical polymerization of monomers in a polyol carrier to produce a free radical polymer dispersed in the base polyol carrier. Conventionally, the free radical polymer can be based on acrylonitrile or styrene-acrylonitrile (SAN). The solids content of the base polyol is typically up to about 60%, usually in the range of from about 15% to about 40%, by weight of the total weight of the composition (i.e., free radical polymer and polyol carrier). Generally, these chain-growth copolymer polyols have a viscosity in the range of from about 2,000 to about 8,000 centipoise. When producing such chain-growth copolymer polyols, it is known to induce grafting of the base polyol chains to the free-radical polymer.

Step-growth copolymer polyols generally are characterized as follows: (i) PHD (Polyharnstoff Disperion) polyols, (ii) PIPA (Poly Isocyanate Poly Addition) polyols, and (iii) epoxy dispersion polyols. PHD polyols are dispersions of polyurea particles in conventional polyols and generally are formed by the reaction of a diamine (e.g., hydrazine) with a diisocyanate (e.g., toluene diisocyanate) in the presence of a polyether polyol. The solids content of the PHD polyols is typically up to about 50%, usually in the range of from about 15% to about 40%, by weight of the total weight of the composition (i.e., polyurea particles and polyol carrier). Generally, PHD polyols have a viscosity in the range of from about 2,000 to about 6,000 centipoise. PIPA polyols are similar to PHD polyols but contain polyurethane particles instead of polyurea particles. The polyurethane particles in PIPA polyols are formed in situ by reaction of an isocyanate and alkanolamine (e.g., triethanolamine). The solids content of the PIPA polyols is typically up to about 80%, usually in the range of from about 15% to about 70%, by weight of the total weight of the composition (i.e., polyurethane particles and polyol carrier). Generally, PIPA polyols have a viscosity in the range of from about 4,000 to about 50,000 centipoise. See, for example, U.S. Pat. Nos. 4,374,209 and 5,292,778. Epoxy dispersion polyols are based on dispersions of cured epoxy resins in conventional based polyols. The epoxy particles are purportedly high modulus solids with improved hydrogen bonding characteristics.

Further information regarding useful graft copolymer polyols may be found, for example, in Chapter 2 of "Flexible Polyurethane Foams" by Herrington and Hock (1997) and the references cited therein.

Despite the advances made in the art, there exists a continued need for the development of novel load building techniques. Specifically, many of the prior art approaches discussed hereinabove involve the use of relatively expensive materials (e.g., the graft copolymer polyols described above) which can be complicated to utilize in a commercial size facility. In addition, there is an ongoing need to try to reduce reliance on petroleum-based ingredients in the production of isocayanate-based foamed polymers. Thus, it would be desirable to have a so-called "bio-based" load building technique which could be conveniently applied to polyurethane foam as at least a partial alternative to conventional "petroleum-based" load building techniques. It would be further desirable if the load building technique: was relatively inexpensive and/or improved other properties of the polyurethane foam and/or could be incorporated into an existing production scheme without great difficulty.

SUMMARY OF THE INVENTION

It is an object of the present invention to obviate or mitigate at least one of the above-mentioned disadvantages of the prior art.

It is another object of the present invention to provide a novel foamed isocyanate-based polymer.

It is another object of the present invention to provide a novel process for producing a foamed isocyanate-based polymer.

It is another object of the present invention to provide a novel polyol-based dispersion.

Accordingly, in one of its aspects, the present invention provides a foamed isocyanate-based polymer derived from a reaction mixture comprising:
  an isocyanate;
  a polyol composition comprising a first prescribed amount of polymer particles dispersed in a base polyol;
  a second prescribed amount of biomass-based carbonaceous particulate material; and
  a blowing agent;
  the foamed isocyanate-based polymer having an Indentation Force Deflection when measured pursuant to ASTM D3574-11 which is within about 15% as that of a reference foam produced by omitting the biomass-based carbonaceous particulate material from the reaction mixture and increasing the amount of polymer particles in the polymer polyol composition to equal the sum of the first prescribed amount and the second prescribed amount.

In another of its aspects, the present invention provides a foamed isocyanate-based polymer derived from:
  an isocyanate; and
  a polyol composition optionally comprising polymer particles dispersed in a base polyol;
  a biomass-based carbonaceous particulate material;
  the foamed polymer having a cellular matrix comprising a plurality of interconnected struts, the biomass-based carbonaceous particulate material conferring to the cellular matrix a load efficiency of at least about 5 Newtons/weight % of biomass-based carbonaceous particulate material.

In another of its aspects, the present invention provides a process for producing a foamed isocyanate-based polymer comprising the steps of:

(a) contacting an isocyanate; a polyol composition optionally comprising a first prescribed amount of polymer particles dispersed in a base polyol, a second prescribed amount of biomass-based carbonaceous particulate material and a blowing agent to produce a reaction mixture; and
  (b) expanding the reaction mixture to produce the foamed isocyanate-based polymer.

In another of its aspects, the present invention provides a polyol-based dispersion comprising:
  (a) a first prescribed amount of a biomass-based carbonaceous particulate material polymer particles; and
  (b) a polyol;
  wherein the dispersion optionally comprises a second prescribed amount of polymer particles.

The present inventors have unexpectedly discovered that a biomass-based carbonaceous particulate material may be used to partially or fully displace the use of polymer particles conventionally used to build load in foamed isocyanate-based polymers such as polyurethane foams. In one preferred embodiment, the biomass-based carbonaceous particulate material is used in an amount to fully displace the use of polymer particles conventionally used to build load in foamed isocyanate-based polymers such as polyurethane foams. In this embodiment, it has been discovered that a relatively expensive petroleum-based copolymer polyol can be fully substituted by a relative inexpensive bio-based (e.g., amorphous carbon) dispersion with no significant compromise in important physical properties in the resulting polyurethane foam. In another preferred embodiment, the biomass-based carbonaceous particulate material is used in an amount to partially displace the use of polymer particles conventionally used to build load in foamed isocyanate-based polymers such as polyurethane foams.

Term "biomass-based carbonaceous particulate material" as used throughout this specification is intended to mean a carbonaceous material derived through torrefication and/or pyrolysis and/or carbonization of a lignocellulosic and/or cellulosic material. These materials typically are plant-based in origin. A lignocellulose is a structural material that comprises much of the mass of plants. Lignocellulose is composed mainly of cellulose, hemicellulose and lignin.

The following is a non-limiting list of examples of a feedstock for production of biomass-based carbonaceous particulate material: coniferous and deciduous wood, nut shells (e.g., coconut, walnut, hazelnut, peanut, etc.), bamboo, rice hulls, grasses, corn stover, plant matter, seeds, paper, cardboard, manure, other agricultural residues, biorefinery residues, sorghum, dried algae, coffee beans, coffee grounds, grounds, sugar cane bagasse and any mixture of two or more of these. Such a feedstock (alone or in combination) can be subjected to pyrolysis and/or carbonization to produce a biomass-based carbonaceous particulate material with the desired characteristics (described herein) to be useful to produce the present foamed isocyanate-based polymer.

An ASTM standard measurement (i.e., not a pass/fail criteria) is used to calculate the level of biobased or renewable material included in a material (i.e., ASTM D6866—Standard Test Methods for Determining the Biobased Content of Solid, Liquid, and Gaseous Samples Using Radiocarbon Analysis) and is helpful in characterizing biomass-based carbonaceous particulate materials useful in the context of the present invention. The application of ASTM D6866 to derive "biobased content" is built on the same concepts as radiocarbon dating, but without use of the age equations. It is done by deriving a ratio of the amount of radiocarbon (14C) in an unknown sample to that of a modern reference standard. The ratio is reported as a percentage with the units "pMC" (percent modern carbon). If the material being analyzed is a mixture of present day radiocarbon and fossil carbon (i.e., containing no radiocarbon), then the pMC value obtained correlates directly to the weight percentage of biomass material present in the sample.

According to ASTM D6866 testing, a biomass-based carbonaceous particulate material useful in the context of the present invention has a percentage of modern carbon "pMC" greater than about 75%, preferably greater than about 85% and most preferably greater than about 95%.

Thus, it will be understood that the term "biomass-based carbonaceous particulate material", in the context of the present invention, excludes carbonaceoius particulate material that is derived from petroleum sources—e.g., carbon black and the like.

An added advantage of using a biomass-based carbonaceous particulate material in the context of the present invention is that it allows for omission of additives typically used in the foam formulation to confer a black colour to the resulting foam—e.g., it allows for omission of carbon black from the foam formulation.

The present foamed isocyanate-based polymer can be produced in the form of a molded foam or a slab foam. The precise details of making such foam are not particularly restricted.

DETAILED DESCRIPTION OF THE PREFERRED EMBODIMENTS

In one of its aspects, the present invention relates to a foamed isocyanate-based polymer derived from a reaction mixture comprising: an isocyanate; a polyol composition comprising a first prescribed amount of polymer particles dispersed in a base polyol; a second prescribed amount of biomass-based carbonaceous particulate material; and a blowing agent; the foamed isocyanate-based polymer having an Indentation Force Deflection when measured pursuant to ASTM D3574-11 which is within about 15% as that of a reference foam produced by omitting the biomass-based carbonaceous particulate material from the reaction mixture and increasing the amount of polymer particles in the polymer polyol composition to equal the sum of the first prescribed amount and the second prescribed amount.

Preferred embodiments of this may include any one or a combination of any two or more of any of the following features:
  the first prescribed amount is zero such that the base polyol composition is the base polyol;
  the biomass-based carbonaceous particulate material is dispersed in the base polyol composition prior to formation of the reaction mixture;
  the biomass-based carbonaceous particulate material has a D50 particle size of less than about 50 μm;
  the biomass-based carbonaceous particulate material has a D50 particle size in the range of from about 0.01 μm to about 50 μm;
  the biomass-based carbonaceous particulate material has a D50 particle size in the range of from about 0.1 μm to about 50 μm;
  the biomass-based carbonaceous particulate material has a D50 particle size in the range of from about 0.1 μm to about 45 μm;
  the biomass-based carbonaceous particulate material has a D50 particle size in the range of from about 0.1 μm to about 40 μm;
  the biomass-based carbonaceous particulate material has a D50 particle size in the range of from about 0.1 μm to about 35 μm;
  the biomass-based carbonaceous particulate material has a D50 particle size in the range of from about 0.2 μm to about 30 μm;
  the biomass-based carbonaceous particulate material has a D50 particle size in the range of from about 0.2 μm to about 25 μm;
  the biomass-based carbonaceous particulate material has a D50 particle size in the range of from about 0.2 μm to about 20 μm;
  the biomass-based carbonaceous particulate material has a D50 particle size in the range of from about 0.2 μm to about 15 μm;
  the biomass-based carbonaceous particulate material has a D50 particle size in the range of from about 0.2 μm to about 10 μm;
  the biomass-based carbonaceous particulate material has a D50 particle size in the range of from about 0.2 μm to about 8 μm;
  the biomass-based carbonaceous particulate material has a D50 particle size in the range of from about 0.2 μm to about 6 μm;
  the biomass-based carbonaceous particulate material has a D50 particle size in the range of from about 0.3 μm to about 6 μm;
  the biomass-based carbonaceous particulate material has a D50 particle size in the range of from about 0.4 μm to about 6 μm;
  the biomass-based carbonaceous particulate material has a D50 particle size in the range of from about 0.5 μm to about 6 μm;
  the biomass-based carbonaceous particulate material has a D50 particle size of about 6 μm;
  the biomass-based carbonaceous particulate material has a D50 particle size of about 1.3 μm;
  the biomass-based carbonaceous particulate material has a D50 particle size of about 0.9 μm;
  the biomass-based carbonaceous particulate material has a D50 particle size of about 0.5 μm;
  the foamed isocyanate-based polymer having an Indentation Force Deflection when measured pursuant to ASTM D3574-11 which is within about 13% as that of the reference foam;
  the foamed isocyanate-based polymer having an Indentation Force Deflection when measured pursuant to ASTM D3574-11 which is within about 11% as that of the reference foam;
  the foamed isocyanate-based polymer having an Indentation Force Deflection when measured pursuant to ASTM D3574-11 which is within about 10% as that of the reference foam;
  the foamed isocyanate-based polymer having an Indentation Force Deflection when measured pursuant to ASTM D3574-11 which is within about 8% as that of the reference foam;
  the foamed isocyanate-based polymer having an Indentation Force Deflection when measured pursuant to ASTM D3574-11 which is within about 6% as that of the reference foam;
  the foamed isocyanate-based polymer having an Indentation Force Deflection when measured pursuant to ASTM D3574-11 which is within about 5% as that of the reference foam;
  the biomass-based carbonaceous particulate material comprises an organic carbon content in the range of from about 50% to about 98% when measured by dry combustion using ASTM D4373;

the biomass-based carbonaceous particulate material comprises an organic carbon content in the range of from about 75% to about 98% when measured by dry combustion using ASTM D4373;

the biomass-based carbonaceous particulate material comprises an organic carbon content in the range of from about 85% to about 98% when measured by dry combustion using ASTM D4373;

the biomass-based carbonaceous particulate material comprises hydrogen to carbon molar ratio in the range of from about 0.10 to about 0.85 when measured by dry combustion using ASTM D4373;

the biomass-based carbonaceous particulate material comprises hydrogen to carbon molar ratio in the range of from about 0.35 to about 0.85 when measured by dry combustion using ASTM D4373;

the biomass-based carbonaceous particulate material comprises hydrogen to carbon molar ratio in the range of from about 0.70 to about 0.85 when measured by dry combustion using ASTM D4373;

the biomass-based carbonaceous particulate material has a surface area of from about 10 to about 4000 $m^2/g$ when measured by a BET method;

the biomass-based carbonaceous particulate material has a surface area of from about 50 to about 3000 $m^2/g$ when measured by a BET method;

the biomass-based carbonaceous particulate material has a surface area of from about 150 to about 2000 $m^2/g$ when measured by a BET method;

the reaction mixture is substantially completely free of polymer particles dispersed in the base polyol;

the base polyol comprises a hydroxyl-terminated backbone of a member selected from the group consisting of polyether, polyesters, polycarbonate, polydiene and polycaprolactone;

the base polyol is selected from the group consisting of hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols and mixtures thereof;

the base polyol is selected from the group consisting of adipic acid-ethylene glycol polyester, poly(butylene glycol), poly(propylene glycol), hydroxyl-terminated polybutadiene and mixtures thereof;

the base polyol is a polyether polyol;

the polyether polyol has a molecular weight in the range of from about 200 to about 10,000;

the polyether polyol has a molecular weight in the range of from about 2000 to about 7,000;

the polyether polyol has a molecular weight in the range of from about 2,000 to about 6,000;

the reaction mixture further comprises an active hydrogen-containing compound selected from group consisting of a polyamine, a polyalkanolamine and any mixture thereof;

the polyamine is selected from the group consisting of a primary amine terminated polyether, a secondary amine terminated polyether and any mixture thereof;

the isocyanate comprises a prepolymer;

the isocyanate is selected from the group consisting of 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof;

the isocyanate is selected from the group consisting of 2,4-toluene diisocyanate, 2,6-toluene diisocyanate and mixtures thereof;

the foamed isocyanate-based polymer defined in any one of claims 1-48, wherein the isocyanate is selected from the group consisting essentially of (i) 2,4'-diphenylmethane diisocyanate, 4,4'-diphenylmethane diisocyanate and mixtures thereof; and (ii) mixtures of (i) with an isocyanate selected from the group consisting of 2,4-toluene diisocyanate, 2,6-toluene diisocyanate and mixtures thereof;

the blowing agent comprises water;

the blowing agent consists of water;

the water is used in an amount in the range of from about 0.5 to about 40 parts by weight per 100 parts by weight of base polyol used in the reaction mixture;

the water is used in an amount in the range of from about 1.0 to about 10 parts by weight per 100 parts by weight of base polyol used in the reaction mixture; and/or the foamed isocyanate based polymer is molded.

In another of its aspects, the present invention relates to a foamed isocyanate-based polymer derived from an isocyanate; and a polyol composition optionally comprising polymer particles dispersed in a base polyol; a biomass-based carbonaceous particulate material; the foamed polymer having a cellular matrix comprising a plurality of interconnected struts, the biomass-based carbonaceous particulate material conferring to the cellular matrix a load efficiency of at least about 5 Newtons/weight % of biomass-based carbonaceous particulate material.

Preferred embodiments of this may include any one or a combination of any two or more of any of the following features:

the first prescribed amount is zero such that the base polyol composition is the base polyol;

the biomass-based carbonaceous particulate material is dispersed in the base polyol composition prior to formation of the reaction mixture;

the biomass-based carbonaceous particulate material has a D50 particle size of less than about 50 μm;

the biomass-based carbonaceous particulate material has a D50 particle size in the range of from about 0.01 μm to about 50 μm;

the biomass-based carbonaceous particulate material has a D50 particle size in the range of from about 0.1 μm to about 50 μm;

the biomass-based carbonaceous particulate material has a D50 particle size in the range of from about 0.1 μm to about 45 μm;

the biomass-based carbonaceous particulate material has a D50 particle size in the range of from about 0.1 μm to about 40 μm;

the biomass-based carbonaceous particulate material has a D50 particle size in the range of from about 0.1 µm to about 35 µm;
the biomass-based carbonaceous particulate material has a D50 particle size in the range of from about 0.2 µm to about 30 µm;
the biomass-based carbonaceous particulate material has a D50 particle size in the range of from about 0.2 µm to about 25 µm;
the biomass-based carbonaceous particulate material has a D50 particle size in the range of from about 0.2 µm to about 20 µm;
the biomass-based carbonaceous particulate material has a D50 particle size in the range of from about 0.2 µm to about 15 µm;
the biomass-based carbonaceous particulate material has a D50 particle size in the range of from about 0.2 µm to about 10 µm;
the biomass-based carbonaceous particulate material has a D50 particle size in the range of from about 0.2 µm to about 8 µm;
the biomass-based carbonaceous particulate material has a D50 particle size in the range of from about 0.2 µm to about 6 µm;
the biomass-based carbonaceous particulate material has a D50 particle size in the range of from about 0.3 µm to about 6 µm;
the biomass-based carbonaceous particulate material has a D50 particle size in the range of from about 0.4 µm to about 6 µm;
the biomass-based carbonaceous particulate material has a D50 particle size in the range of from about 0.5 µm to about 6 µm;
the biomass-based carbonaceous particulate material has a D50 particle size of about 6 µm;
the biomass-based carbonaceous particulate material has a D50 particle size of about 1.3 µm;
the biomass-based carbonaceous particulate material has a D50 particle size of about 0.9 µm;
the biomass-based carbonaceous particulate material has a D50 particle size of about 0.5 µm;
the foamed isocyanate-based polymer has an Indentation Force Deflection when measured pursuant to ASTM D3574-11 which is within about 15% as that of a reference foam produced by substituting an amount polymer particles in the base polyol that is equal to the amount of the biomass-based carbonaceous particulate material in the reaction mixture;
the foamed isocyanate-based polymer has an Indentation Force Deflection when measured pursuant to ASTM D3574-11 which is within about 13% as that of the reference foam;
the foamed isocyanate-based polymer has an Indentation Force Deflection when measured pursuant to ASTM D3574-11 which is within about 11% as that of the reference foam;
the foamed isocyanate-based polymer has an Indentation Force Deflection when measured pursuant to ASTM D3574-11 which is within about 10% as that of the reference foam;
the foamed isocyanate-based polymer has an Indentation Force Deflection when measured pursuant to ASTM D3574-11 which is within about 8% as that of the reference foam;
the foamed isocyanate-based polymer has an Indentation Force Deflection when measured pursuant to ASTM D3574-11 which is within about 6% as that of the reference foam;
the foamed isocyanate-based polymer has an Indentation Force Deflection when measured pursuant to ASTM D3574-11 which is within about 5% as that of the reference foam;
the biomass-based carbonaceous particulate material comprises an organic carbon content in the range of from about 50% to about 98% when measured by dry combustion using ASTM D4373;
the biomass-based carbonaceous particulate material comprises an organic carbon content in the range of from about 75% to about 98% when measured by dry combustion using ASTM D4373;
the biomass-based carbonaceous particulate material comprises an organic carbon content in the range of from about 85% to about 98% when measured by dry combustion using ASTM D4373;
the biomass-based carbonaceous particulate material comprises hydrogen to carbon molar ratio in the range of from about 0.10 to about 0.85 when measured by dry combustion using ASTM D4373;
the biomass-based carbonaceous particulate material comprises hydrogen to carbon molar ratio in the range of from about 0.35 to about 0.85 when measured by dry combustion using ASTM D4373;
the biomass-based carbonaceous particulate material comprises hydrogen to carbon molar ratio in the range of from about 0.70 to about 0.85 when measured by dry combustion using ASTM D4373;
the biomass-based carbonaceous particulate material has a surface area of from about 10 to about 4000 $m^2/g$ when measured by a BET method;
biomass-based carbonaceous particulate material has a surface area of from about 50 to about 3000 $m^2/g$ when measured by a BET method;
the biomass-based carbonaceous particulate material has a surface area of from about 150 to about 2000 $m^2/g$ when measured by a BET method;
the reaction mixture is substantially completely free of polymer particles dispersed in the base polyol;
the base polyol comprises a hydroxyl-terminated backbone of a member selected from the group consisting of polyether, polyesters, polycarbonate, polydiene and polycaprolactone;
the base polyol is selected from the group consisting of hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols and mixtures thereof;
the base polyol is selected from the group consisting of adipic acid-ethylene glycol polyester, poly(butylene glycol), poly(propylene glycol), hydroxyl-terminated polybutadiene and mixtures thereof;
the base polyol is a polyether polyol;
the polyether polyol has a molecular weight in the range of from about 200 to about 10,000;
the polyether polyol has a molecular weight in the range of from about 2000 to about 7,000;
the polyether polyol has a molecular weight in the range of from about 2,000 to about 6,000;

the reaction mixture further comprises an active hydrogen-containing compound selected from group consisting of a polyamine, a polyalkanolamine and any mixture thereof;

the polyamine is selected from the group consisting of a primary amine terminated polyether, a secondary amine terminated polyether and any mixture thereof;

the isocyanate comprises a prepolymer;

the isocyanate is selected from the group consisting of 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof;

the isocyanate is selected from the group consisting of 2,4-toluene diisocyanate, 2,6-toluene diisocyanate and mixtures thereof;

the isocyanate is selected from the group consisting essentially of (i) 2,4'-diphenylmethane diisocyanate, 4,4'-diphenylmethane diisocyanate and mixtures thereof; and (ii) mixtures of (i) with an isocyanate selected from the group consisting of 2,4-toluene diisocyanate, 2,6-toluene diisocyanate and mixtures thereof;

the blowing agent comprises water;

the blowing agent consists of water;

the water is used in an amount in the range of from about 0.5 to about 40 parts by weight per 100 parts by weight of base polyol used in the reaction mixture;

the water is used in an amount in the range of from about 1.0 to about 10 parts by weight per 100 parts by weight of base polyol used in the reaction mixture; and/or the foamed isocyanate based polymer is molded.

In yet another of its aspects, the present invention relates to a process for producing a foamed isocyanate-based polymer comprising the steps of: (a) contacting an isocyanate; a polyol composition optionally comprising a first prescribed amount of polymer particles dispersed in a base polyol, a second prescribed amount of biomass-based carbonaceous particulate material and a blowing agent to produce a reaction mixture; and (b) expanding the reaction mixture to produce the foamed isocyanate-based polymer.

Preferred embodiments of this may include any one or a combination of any two or more of any of the following features:

the first prescribed amount is zero such that the base polyol composition is the base polyol;

the biomass-based carbonaceous particulate material is dispersed in the base polyol composition prior to formation of the reaction mixture;

the biomass-based carbonaceous particulate material has a D50 particle size of less than about 50 µm;

the biomass-based carbonaceous particulate material has a D50 particle size in the range of from about 0.01 µm to about 50 µm;

the biomass-based carbonaceous particulate material has a D50 particle size in the range of from about 0.1 µm to about 50 µm;

the biomass-based carbonaceous particulate material has a D50 particle size in the range of from about 0.1 µm to about 45 µm;

the biomass-based carbonaceous particulate material has a D50 particle size in the range of from about 0.1 µm to about 40 µm;

the biomass-based carbonaceous particulate material has a D50 particle size in the range of from about 0.1 µm to about 35 µm;

the biomass-based carbonaceous particulate material has a D50 particle size in the range of from about 0.2 µm to about 30 µm;

the biomass-based carbonaceous particulate material has a D50 particle size in the range of from about 0.2 µm to about 25 µm;

the biomass-based carbonaceous particulate material has a D50 particle size in the range of from about 0.2 µm to about 20 µm;

the biomass-based carbonaceous particulate material has a D50 particle size in the range of from about 0.2 µm to about 15 µm;

the biomass-based carbonaceous particulate material has a D50 particle size in the range of from about 0.2 µm to about 10 µm;

the biomass-based carbonaceous particulate material has a D50 particle size in the range of from about 0.2 µm to about 8 µm;

the biomass-based carbonaceous particulate material has a D50 particle size in the range of from about 0.2 µm to about 6 µm;

the biomass-based carbonaceous particulate material has a D50 particle size in the range of from about 0.3 µm to about 6 µm;

the biomass-based carbonaceous particulate material has a D50 particle size in the range of from about 0.4 µm to about 6 µm;

the biomass-based carbonaceous particulate material has a D50 particle size in the range of from about 0.5 µm to about 6 µm;

the biomass-based carbonaceous particulate material has a D50 particle size of about 6 µm;

the biomass-based carbonaceous particulate material has a D50 particle size of about 1.3 µm;

the biomass-based carbonaceous particulate material has a D50 particle size of about 0.9 µm;

the biomass-based carbonaceous particulate material has a D50 particle size of about 0.5 µm;

the biomass-based carbonaceous particulate material comprises an organic carbon content in the range of from about 50% to about 98% when measured by dry combustion using ASTM D4373;

the biomass-based carbonaceous particulate material comprises an organic carbon content in the range of from about 75% to about 98% when measured by dry combustion using ASTM D4373;

the biomass-based carbonaceous particulate material comprises an organic carbon content in the range of from about 85% to about 98% when measured by dry combustion using ASTM D4373;

the biomass-based carbonaceous particulate material comprises hydrogen to carbon molar ratio in the range of from about 0.10 to about 0.85 when measured by dry combustion using ASTM D4373;

the biomass-based carbonaceous particulate material comprises hydrogen to carbon molar ratio in the range of from about 0.35 to about 0.85 when measured by dry combustion using ASTM D4373;

the biomass-based carbonaceous particulate material comprises hydrogen to carbon molar ratio in the range of from about 0.70 to about 0.85 when measured by dry combustion using ASTM D4373;

the biomass-based carbonaceous particulate material has a surface area of from about 10 to about 4000 m$^2$/g when measured by a BET method;

the biomass-based carbonaceous particulate material has a surface area of from about 50 to about 3000 m$^2$/g when measured by a BET method;

the biomass-based carbonaceous particulate material has a surface area of from about 150 to about 2000 m$^2$/g when measured by a BET method;

the reaction mixture is substantially completely free of polymer particles dispersed in the base polyol;

the base polyol comprises a hydroxyl-terminated backbone of a member selected from the group consisting of polyether, polyesters, polycarbonate, polydiene and polycaprolactone;

the base polyol is selected from the group consisting of hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols and mixtures thereof;

the base polyol is selected from the group consisting of adipic acid-ethylene glycol polyester, poly(butylene glycol), poly(propylene glycol), hydroxyl-terminated polybutadiene and mixtures thereof;

the base polyol is a polyether polyol;

the polyether polyol has a molecular weight in the range of from about 200 to about 10,000;

the polyether polyol has a molecular weight in the range of from about 2000 to about 7,000;

the polyether polyol has a molecular weight in the range of from about 2,000 to about 6,000;

the reaction mixture further comprises an active hydrogen-containing compound selected from group consisting of a polyamine, a polyalkanolamine and any mixture thereof;

the polyamine is selected from the group consisting of a primary amine terminated polyether, a secondary amine terminated polyether and any mixture thereof;

the isocyanate comprises a prepolymer;

the isocyanate is selected from the group consisting of 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof;

the isocyanate is selected from the group consisting of 2,4-toluene diisocyanate, 2,6-toluene diisocyanate and mixtures thereof;

the isocyanate is selected from the group consisting essentially of (i) 2,4'-diphenylmethane diisocyanate, 4,4'-diphenylmethane diisocyanate and mixtures thereof; and (ii) mixtures of (i) with an isocyanate selected from the group consisting of 2,4-toluene diisocyanate, 2,6-toluene diisocyanate and mixtures thereof;

the blowing agent comprises water;

the blowing agent consists of water;

the water is used in an amount in the range of from about 0.5 to about 40 parts by weight per 100 parts by weight of base polyol used in the reaction mixture;

the water is used in an amount in the range of from about 1.0 to about 10 parts by weight per 100 parts by weight of base polyol used in the reaction mixture;

Step (b) is conducted in a closed mold configured to produce the foamed isocyanate based polymer as a molded foam; and/or Step (b) is conducted in a channel having an open top to produce the foamed isocyanate based polymer as a slab foam.

In yet another of its aspects, the present invention relates to a polyol-based dispersion comprising: (a) a first prescribed amount of a biomass-based carbonaceous particulate material polymer particles; and (b) a polyol; wherein the dispersion optionally comprises a second prescribed amount of polymer particles.

Preferred embodiments of this may include any one or a combination of any two or more of any of the following features:

the biomass-based carbonaceous particulate material has a D50 particle size of less than about 50 μm;

the biomass-based carbonaceous particulate material has a D50 particle size in the range of from about 0.01 μm to about 50 μm;

the biomass-based carbonaceous particulate material has a D50 particle size in the range of from about 0.1 μm to about 50 μm;

the biomass-based carbonaceous particulate material has a D50 particle size in the range of from about 0.1 μm to about 45 μm;

the biomass-based carbonaceous particulate material has a D50 particle size in the range of from about 0.1 μm to about 40 μm;

the biomass-based carbonaceous particulate material has a D50 particle size in the range of from about 0.1 μm to about 35 μm;

the biomass-based carbonaceous particulate material has a D50 particle size in the range of from about 0.2 μm to about 30 μm;

the biomass-based carbonaceous particulate material has a D50 particle size in the range of from about 0.2 μm to about 25 μm;

the biomass-based carbonaceous particulate material has a D50 particle size in the range of from about 0.2 μm to about 20 μm;

the biomass-based carbonaceous particulate material has a D50 particle size in the range of from about 0.2 μm to about 15 μm;

the biomass-based carbonaceous particulate material has a D50 particle size in the range of from about 0.2 μm to about 10 μm;

the biomass-based carbonaceous particulate material has a D50 particle size in the range of from about 0.2 μm to about 8 μm;
the biomass-based carbonaceous particulate material has a D50 particle size in the range of from about 0.2 μm to about 6 μm;
the biomass-based carbonaceous particulate material has a D50 particle size in the range of from about 0.3 μm to about 6 μm;
the biomass-based carbonaceous particulate material has a D50 particle size in the range of from about 0.4 μm to about 6 μm;
the biomass-based carbonaceous particulate material has a D50 particle size in the range of from about 0.5 μm to about 6 μm;
the biomass-based carbonaceous particulate material has a D50 particle size of about 6 μm;
the biomass-based carbonaceous particulate material has a D50 particle size of about 1.3 μm;
the biomass-based carbonaceous particulate material has a D50 particle size of about 0.9 μm;
the biomass-based carbonaceous particulate material has a D50 particle size of about 0.5 μm;
the biomass-based carbonaceous particulate material comprises an organic carbon content in the range of from about 50% to about 98% when measured by dry combustion using ASTM D4373;
the biomass-based carbonaceous particulate material comprises an organic carbon content in the range of from about 75% to about 98% when measured by dry combustion using ASTM D4373;
the biomass-based carbonaceous particulate material comprises an organic carbon content in the range of from about 85% to about 98% when measured by dry combustion using ASTM D4373;
the biomass-based carbonaceous particulate material comprises hydrogen to carbon molar ratio in the range of from about 0.10 to about 0.85 when measured by dry combustion using ASTM D4373;
the biomass-based carbonaceous particulate material comprises hydrogen to carbon molar ratio in the range of from about 0.35 to about 0.85 when measured by dry combustion using ASTM D4373;
the biomass-based carbonaceous particulate material comprises hydrogen to carbon molar ratio in the range of from about 0.70 to about 0.85 when measured by dry combustion using ASTM D4373;
the biomass-based carbonaceous particulate material has a surface area of from about 10 to about 4000 m²/g when measured by a BET method;
the biomass-based carbonaceous particulate material has a surface area of from about 50 to about 3000 m²/g when measured by a BET method;
the biomass-based carbonaceous particulate material has a surface area of from about 150 to about 2000 m²/g when measured by a BET method;
the dispersion is substantially completely free of polymer particles;
the base polyol comprises a hydroxyl-terminated backbone of a member selected from the group consisting of polyether, polyesters, polycarbonate, polydiene and polycaprolactone;
the base polyol is selected from the group consisting of hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols and mixtures thereof;
the base polyol is selected from the group consisting of adipic acid-ethylene glycol polyester, poly(butylene glycol), poly(propylene glycol), hydroxyl-terminated polybutadiene and mixtures thereof;
the base polyol is a polyether polyol;
the polyether polyol has a molecular weight in the range of from about 200 to about 10,000;
the polyether polyol has a molecular weight in the range of from about 2000 to about 7,000;
the polyether polyol has a molecular weight in the range of from about 2,000 to about 6,000;
he reaction mixture further comprises an active hydrogen-containing compound selected from group consisting of a polyamine, a polyalkanolamine and any mixture thereof; and/or
the polyamine is selected from the group consisting of a primary amine terminated polyether, a secondary amine terminated polyether and any mixture thereof.

The present foamed isocyanate-based polymer is produced from a reaction mixture which comprises an isocyanate and an active hydrogen-containing compound, such as a base polyol.

The isocyanate suitable for use in the reaction mixture is not particularly restricted and the choice thereof is within the purview of a person skilled in the art. Generally, the isocyanate compound suitable for use may be represented by the general formula:

Q(NCO)$_i$ wherein i is an integer of two or more and Q is an organic radical having the valence of i. Q may be a substituted or unsubstituted hydrocarbon group (e.g., an alkylene or arylene group). Moreover, Q may be represented by the general formula:

Q$^1$-Z-Q$^1$ wherein Q$^1$ is an alkylene or arylene group and Z is chosen from the group comprising —O—, —O-Q$^1$-, —CO—, —S—, —S-Q$^1$-S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the base polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

wherein both i and j are integers having a value of 2 or more, and Q" is a polyfunctional organic radical, and/or, as additional components in the reaction mixture, compounds having the general formula:

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group consisting of 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group consisting of 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate.

If the process is utilized to produce a polyurethane foam, the active hydrogen-containing compound is typically a polyol. The choice of polyol is not particularly restricted and is within the purview of a person skilled in the art. For example, the base polyol may be a hydroxyl-terminated backbone of a member selected from the group consisting of polyether, polyester, polycarbonate, polydiene and polycaprolactone. Preferably, the base polyol is selected from the group consisting of hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group consisting of adipic acid-ethylene glycol polyester, poly(butylene glycol), poly(propylene glycol), hydroxyl-terminated polybutadiene and mixtures thereof—see, for example, British patent number 1,482,213, for a discussion of suitable polyols. Preferably, such a polyether polyol has a molecular weight in the range of from about 200 to about 10,000, more preferably from about 2,000 to about 7,000, most preferably from about 2,000 to about 6,000.

If the process is utilized to produce a polyurea foam, the active hydrogen-containing compound comprises compounds wherein hydrogen is bonded to nitrogen. Preferably such compounds are selected from the group consisting of polyamines, polyamides, polyimines and polyolamines, more preferably polyamines. Non-limiting examples of such compounds include primary and secondary amine terminated polyethers. Preferably such polyethers have a molecular weight of greater than about 230 and a functionality of from 2 to 6. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the base polyol be essentially all secondary hydroxyl groups. Typically, the amination step replaces the majority but not all of the hydroxyl groups of the base polyol.

The reaction mixture used to produce the present foamed isocyanate-based polymer typically will further comprise a blowing agent. As is known in the art water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents (e.g., hydrochlorofluorocarbons (HCFC's), hydrofluorocarbons (HFC's such as HFC-365, HFC-245fa and the like), pentane and the like) may be used in conjunction with or in place of water although the use of such direct organic blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

The reaction mixture used to produce the present foamed isocyanate-based polymer typically will further comprise a catalyst. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

Embodiments of the present invention will be illustrated with reference to the following non-limiting examples which should not be used to construe the scope of the invention.

As will be clearly understood by those of skill in the art, it is contemplated that conventional additives in the polyurethane foam art can be incorporated in the reaction mixture created during the present process. Non-limiting examples of such additives include: surfactants (e.g., organo-silicone compounds available under the tradename L-540 Union Carbide), cell openers (e.g., silicone oils), extenders (e.g., halogenated paraffins commercially available as Cereclor™ S45), cross-linkers (e.g., low molecular weight reactive hydrogen-containing compositions), pigments/dyes, flame retardants (e.g., halogenated organo-phosphoric acid compounds), inhibitors (e.g., weak acids), nucleating agents (e.g., diazo compounds), anti-oxidants, and plasticizers/stabilizers (e.g., sulphonated aromatic compounds). The amounts of these additives conventionally used would be within the purview of a person skilled in the art.

In Examples, the following materials were used:
Hyperlite™ E866, base polyol, commercially available from Covestro;
Hyperlite™ E850, a 43% solids content copolymer (SAN) polyol, commercially available from Covestro;
Voranol™ CP1421, base polyol, commercially available from DOW;
Amorphous carbon dispersed in base polyol;
DEOA LF, diethanolamine, a cross-linking agent commercially available from Air Products;
Glycerin, a cross-linking agent, commercially available from Cargill;
Water, indirect blowing agent;
Dabco 33LV, a gelation catalyst, commercially available from Air Products;
Niax A-1, a blowing catalyst, commercially available from Momentive;
Polycat 77, a tertiary amine catalyst, commercially available from Air Products;
Fyrol FR-2, a flame retardant, commercially available from Supresta;
DC5043, a surfactant, commercially available from Dow Corning; and
Mondur™ E445, a blend of TDI (80%) and MDI (20%), commercially available from Covestro.

In addition to these materials, a dispersion of amorphous carbon was produced for use in the Examples illustrating preferred embodiments of the invention. In Example 1, the amorphous carbon was derived from a deciduous wood feedstock comprising primarily maple trees. In the remaining Examples, the amorphous carbon was derived from the following feedstocks:

| Example | Feedstock for Amorphous Carbon |
|---|---|
| 2 | ARTi Sugar Maple Sawdust |
| 3 | Jacobi Coconut Activated Carbon |
| 4 | Royal Oak Hardwood Charcoal |
| 5 | ARTi Hardwood Fibers Biochar |
| 6 | BioBlack ® Miscanthus Biochar |

The dispersion of amorphous carbon was produced as follows:

Step 1—Pulverize the Carbon: Using lab scale pulverize, pulverize 200 grams of carbon using the 0.5 mm screen. The carbon is pulverized to particle size of D100 at 500 microns and D50 at 250 microns.

Step 2—Add polyol: Using 1 gallon metal can, add 150 grams of pulverized carbon to the can and then add 350 grams of polyol. Seal the metal can and roll for 20 minutes. The viscosity is greater than 25,000 cps at 25° C.

Step 3—Initial Mix stage: Open the metal can and mix using a 2 blade mixer for 20 minutes. The viscosity is greater than 20,000 cps at 25° C.

Step 4—Ross Mixer: Set the high shear Ross Mixer to 5,000 rpm mix for 60 minutes. The temperature will rise to above 60° C. and the viscosity is greater than 15,000 cps at 25° C.

Step 5—Media Mill: Using EMI 250 media mill with 70 to 85% loading of beads with bead size of 0.6 mm to 1.5 mm, run the mill at tip speed of 12.4 m/s or greater. Run the machine for 1 hour and record the flow rate every 10 minutes and take a sample for assessment of D50 particle size. Continue running the machine until the follow particle sizes are achieved for individual batches (reference to Tables is for foam formulations described below):

| D50 (μm) | Table |
|---|---|
| 6.0 | 2 |
| 1.3 | 3 |
| 0.9 | 4 |
| 0.5 | 5 |
| 0.8 | 7 |

Unless otherwise stated, all parts reported in Examples are parts by weight.

The Examples illustrate the use of the present amorphous carbon in a typical isocyanate-based high resilience (HR) based foam. In each Example, the isocyanate-based foam was prepared by the pre-blending of all resin ingredients including polyols, copolymer polyols (if used), catalysts, water, and surfactants as well as a dispersion of amorphous carbon in polyether polyol (if used). The isocyanate was excluded from this mixture. The resin blend and isocyanate were then mixed at an isocyanate index of 100 using a conventional two-stream mixing technique and dispensed into a preheated mold (65° C.) having the dimensions 38.1 cm×38.1 cm×10.16 cm. The mold was then closed and the reaction allowed to proceed until the total volume of the mold was filled. After approximately 6 minutes, the isocyanate-based foam was removed and, after proper conditioning, the properties of interest were measured. This methodology will be referred to in the Examples as the General Procedure.

EXAMPLE 1

The actual formulations used in the Example 1 can be found in Tables 1-5. The formulations in Table 1 all contained SAN copolymer polymer at various levels and no amorphous carbon dispersion—therefore, the foams produced from the formulations in Table 1 are for comparative purposes only and are not encompassed by the invention. The formulations in Tables 2-5 all contained amorphous carbon at various levels and no SAN copolymer (or any other polymer) polyol. The differences between the formulations in Tables 2-5 relate the D50 particle size of the amorphous carbon in the amorphous carbon dispersion.

The molded foams producted according to the formulations appearing in Tables 1-5 were subjected to the following physical tests pursuant to ASTM 3574-D11:
- IFD @ 25% deflection;
- IFD @ 50% deflection;
- % hysteresis loss;
- density (kg/m$^3$);
- tear strength (N/m);
- tensile strength (kPa);
- elongation at break (%);
- ball rebound (%);
- 50% compression set (%);
- 50% wet compression set (%);
- 50% hot aged compression set (HACS), 5 hrs @ 120° C. (%); and
- 50% HACS, 3 hrs @ 105° C. (%).

The results of this physical testing are set out in Table 6. In Table 6, the results for the comparative foams made from the formulations in Table 1 are presented twice for ease of comparison (i.e., since Table 6 spans two pages). The results set out in Table 6 demonstrate that foams produced using amorphous carbon (formulations of Tables 2-5) in place of SAN copolymer polyol (formulations of Table 1) have comparable physical properties, particularly at the lower values of D50 for the amorphous carbon dispersion used in the formulation. The significant advantage is that, in the Examples, a relatively expensive petroleum-based copolymer polyol was fully substituted by a relative inexpensive bio-based (amorphous carbon) dispersion with no significant compromise in important physical properties.

EXAMPLES 2-6

The actual formulations used in the Examples 2-6 can be found in Table 7. The formulations in Table 7 for Examples 2-6 all contained SAN copolymer polymer and amorphous carbon at a constant levels. The formulation entitled "Control" contained no amorphous carbon dispersion—therefore, the foam produced from this formulations in Table 7 is for comparative purposes only and is not encompassed by the invention. The formulations in Table 7 all contained amorphous carbon have the same D50 particle size of the amorphous carbon in the amorphous carbon dispersion—0.8 μm.

The formulations in Table 7 were used in the above-mentioned General Procedure to produce corresponding molded foams.

The molded foams producted according to the formulations appearing in Tables 1-5 were subjected to the following physical tests pursuant to ASTM 3574-D11:
- IFD @ 25% deflection;
- IFD @ 50% deflection;
- IFD @ 65% deflection;
- % hysteresis loss;
- density (kg/m$^3$);
- tear strength (N/m);
- tensile strength (kPa);
- elongation at break (%);
- 50% compression set (%);
- 50% wet compression set (%);
- 50% hot aged compression set (HACS), 5 hrs @ 120° C. (%); and
- 50% HACS, 3 hrs @ 105° C. (%).

The results of this physical testing are set out in Table 8. The results set out in Table 8 demonstrate that foams produced using amorphous carbon (Examples 2-5) in place of a portion of the SAN copolymer polyol used in the Control have comparable physical properties. The significant advantage is that, in the Examples, a relatively expensive petroleum-based copolymer polyol was partially substituted by a relative inexpensive bio-based (amorphous carbon) dispersion with no significant compromise in important physical properties.

These results have provided the inventors with a reasonable inference and/or expectation that commensurate results can be obtained using different base polyols, isocyanates, catalysts and other additives in the foam formulations.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

| Formulation | SAN | | | |
| --- | --- | --- | --- | --- |
|  | Ctrl1 | Ctrl2 | Ctrl3 | Ctrl4 |
| E-866 | 86.43 | 73.90 | 61.45 | 48.90 |
| E-850 | 12.47 | 25.00 | 37.45 | 50.00 |
| Amorphous Carbon Dispersion | 0.00 | 0.00 | 0.00 | 0.00 |
| Water | 3.73 | 3.73 | 3.73 | 3.73 |
| DEOA-LF | 1.10 | 1.10 | 1.10 | 1.10 |
| Glycerin | 0.00 | 0.00 | 0.00 | 0.00 |
| 33LV | 0.35 | 0.35 | 0.35 | 0.35 |
| DC5043 | 1.00 | 1.00 | 1.00 | 1.00 |
| CP1421 | 1.10 | 1.10 | 1.10 | 1.10 |
| FR-2 | 0.50 | 0.50 | 0.50 | 0.50 |
| A1 | 0.06 | 0.06 | 0.06 | 0.06 |
| Polycat 77 | 0.18 | 0.18 | 0.18 | 0.18 |
| Total | 106.92 | 106.92 | 106.92 | 106.92 |
| SAN % solids | 5.0 | 10.1 | 15.1 | 20.1 |
| Carbonaceous % solids | 0.00 | 0.00 | 0.00 | 0.00 |
| Total % solids | 5.0 | 10.1 | 15.1 | 20.1 |
| % water | 3.64 | 3.64 | 3.64 | 3.64 |
| ISO Req (E445) | 48.33 | 48.10 | 47.86 | 47.62 |
| I/R ratio (100 index) | 0.4520 | 0.4498 | 0.4476 | 0.4454 |

TABLE 2

| Formulation | Amorphous Carbon With D50 6.0 micron | | | |
| --- | --- | --- | --- | --- |
|  | Exp1-A | Exp1-B | Exp1-C | Exp1-D |
| E-866 | 81.00 | 63.30 | 45.30 | 27.50 |
| E-850 | 0.00 | 0.00 | 0.00 | 0.00 |
| Amorphous Carbon Dispersion | 17.90 | 35.60 | 53.60 | 71.40 |
| Water | 3.68 | 3.62 | 3.57 | 3.51 |
| DEOA-LF | 1.10 | 1.10 | 1.10 | 1.10 |
| Glycerin | 0.00 | 0.00 | 0.00 | 0.00 |
| 33LV | 0.35 | 0.35 | 0.35 | 0.35 |
| DC5043 | 1.00 | 1.00 | 1.00 | 1.00 |
| CP1421 | 1.10 | 1.10 | 1.10 | 1.10 |
| FR-2 | 0.50 | 0.50 | 0.50 | 0.50 |
| A1 | 0.06 | 0.06 | 0.06 | 0.06 |
| Polycat 77 | 0.18 | 0.18 | 0.18 | 0.18 |
| Total | 106.87 | 106.81 | 106.76 | 106.70 |

TABLE 2-continued

| | Amorphous Carbon With D50 6.0 micron | | | |
|---|---|---|---|---|
| Formulation | Exp1-A | Exp1-B | Exp1-C | Exp1-D |
| SAN % solids | 0.00 | 0.00 | 0.00 | 0.00 |
| Carbonaceous % solids | 5.0 | 10.0 | 15.1 | 20.1 |
| Total % solids | 5.0 | 10.0 | 15.1 | 20.1 |
| % water | 3.65 | 3.64 | 3.65 | 3.64 |
| ISO Req (E445) | 48.31 | 47.95 | 47.70 | 47.15 |
| I/R ratio (100 index) | 0.4521 | 0.4489 | 0.4468 | 0.4419 |

TABLE 3

| | Amorphous Carbon With D50 1.3 micron | | | |
|---|---|---|---|---|
| Formulation | Exp1-A | Exp1-B | Exp1-C | Exp1-D |
| E-866 | 81.00 | 63.27 | 45.40 | 27.60 |
| E-850 | 0.00 | 0.00 | 0.00 | 0.00 |
| Amorphous Carbon Dispersion | 17.90 | 35.63 | 53.50 | 71.30 |
| Water | 3.68 | 3.62 | 3.57 | 3.51 |
| DEOA-LF | 1.10 | 1.10 | 1.10 | 1.10 |
| Glycerin | 0.00 | 0.00 | 0.00 | 0.00 |
| 33LV | 0.35 | 0.35 | 0.35 | 0.35 |
| DC5043 | 1.00 | 1.00 | 1.00 | 1.00 |
| CP1421 | 1.10 | 1.10 | 1.10 | 1.10 |
| FR-2 | 0.50 | 0.50 | 0.50 | 0.50 |
| A1 | 0.06 | 0.06 | 0.06 | 0.06 |
| Polycat 77 | 0.18 | 0.18 | 0.18 | 0.18 |
| Total | 106.87 | 106.81 | 106.76 | 106.70 |
| SAN % solids | 0.00 | 0.00 | 0.00 | 0.00 |
| Carbonaceous % solids | 5.0 | 10.0 | 15.0 | 20.0 |
| Total % solids | 5.0 | 10.0 | 15.0 | 20.0 |
| % water | 3.65 | 3.64 | 3.65 | 3.64 |
| ISO Req (E445) | 48.31 | 47.95 | 47.70 | 47.33 |
| I/R ratio (100 index) | 0.4521 | 0.4489 | 0.4468 | 0.4436 |

TABLE 4

| | Amorphous Carbon With D50 0.89 micron | | | |
|---|---|---|---|---|
| Formulation | Exp1-A | Exp1-B | Exp1-C | Exp1-D |
| E-866 | 74.50 | 50.10 | 25.80 | 1.40 |
| E-850 | 0.00 | 0.00 | 0.00 | 0.00 |
| Amorphous Carbon Dispersion | 24.40 | 48.80 | 73.10 | 97.50 |

TABLE 4-continued

| | Amorphous Carbon With D50 0.89 micron | | | |
|---|---|---|---|---|
| Formulation | Exp1-A | Exp1-B | Exp1-C | Exp1-D |
| Water | 3.65 | 3.57 | 3.48 | 3.40 |
| DEOA-LF | 1.10 | 1.10 | 1.10 | 1.10 |
| Glycerin | 0.00 | 0.00 | 0.00 | 0.00 |
| 33LV | 0.35 | 0.35 | 0.35 | 0.35 |
| DC5043 | 1.00 | 1.00 | 1.00 | 1.00 |
| CP1421 | 1.10 | 1.10 | 1.10 | 1.10 |
| FR-2 | 0.50 | 0.50 | 0.50 | 0.50 |
| A1 | 0.06 | 0.06 | 0.06 | 0.06 |
| Polycat 77 | 0.18 | 0.18 | 0.18 | 0.18 |
| Total | 106.84 | 106.76 | 106.67 | 106.59 |
| SAN % solids | 0.00 | 0.00 | 0.00 | 0.00 |
| Carbonaceous % solids | 5.0 | 10.1 | 15.1 | 20.1 |
| Total % solids | 5.0 | 10.1 | 15.1 | 20.1 |
| % water | 3.64 | 3.65 | 3.64 | 3.64 |
| ISO Req (E445) | 48.28 | 47.98 | 47.59 | 47.30 |
| I/R ratio (100 index) | 0.4519 | 0.4495 | 0.4461 | 0.4437 |

TABLE 5

| | Amorphous Carbon With D50 0.5 micron | | | |
|---|---|---|---|---|
| Formulation | Exp1-A | Exp1-B | Exp1-C | Exp1-D |
| E-866 | 74.40 | 50.00 | 25.80 | 1.40 |
| E-850 | 0.00 | 0.00 | 0.00 | 0.00 |
| Amorphous Carbon Dispersion | 24.50 | 48.90 | 73.10 | 97.50 |
| Water | 3.65 | 3.58 | 3.50 | 3.43 |
| DEOA-LF | 1.10 | 1.10 | 1.10 | 1.10 |
| Glycerin | 0.00 | 0.00 | 0.00 | 0.00 |
| 33LV | 0.35 | 0.35 | 0.35 | 0.35 |
| DC5043 | 1.00 | 1.00 | 1.00 | 1.00 |
| CP1421 | 1.10 | 1.10 | 1.10 | 1.10 |
| FR-2 | 0.50 | 0.50 | 0.50 | 0.50 |
| A1 | 0.06 | 0.06 | 0.06 | 0.06 |
| Polycat 77 | 0.18 | 0.18 | 0.18 | 0.18 |
| Total | 106.84 | 106.77 | 106.69 | 106.62 |
| SAN % solids | 0.00 | 0.00 | 0.00 | 0.00 |
| Carbonaceous % solids | 5.0 | 10.1 | 15.1 | 20.1 |
| Total % solids | 5.0 | 10.1 | 15.1 | 20.1 |
| % water | 3.64 | 3.64 | 3.64 | 3.65 |
| ISO Req (E445) | 48.21 | 47.96 | 47.60 | 47.34 |
| I/R ratio (100 index) | 0.4513 | 0.4492 | 0.4461 | 0.4441 |

TABLE 6

| | | | | | | | Amorphous Carbon | | | | | | | |
|---|---|---|---|---|---|---|---|---|---|---|---|---|---|---|
| Property (ASTM D3574-11) | ASTM | SAN | | | | D50 = 6 micron | | | | D50 = 1.3 micron | | | | |
| % solids | Test | 5 | 10 | 15 | 20 | 5 | 10 | 15 | 20 | 5 | 10 | 15 | 20 |
| IFD @ 25% deflection | N | Test B1 | 98 | 117 | 140 | 172 | 92 | 107 | 129 | 154 | 89 | 103 | 117 | 148 |
| IFD @ 50% deflection | N | Test B1 | 187 | 225 | 271 | 337 | 171 | 206 | 247 | 280 | 168 | 196 | 225 | 266 |
| % Hysteresis Loss | | | 23.8 | 26.2 | 28.9 | 32.1 | 23.6 | 24.9 | 27.1 | 28.4 | 23.6 | 23.9 | 25.1 | 27 |
| Density | kg/m³ | Test A | 35.3 | 34.7 | 33.8 | 34.6 | 35.4 | 34.5 | 33 | 32.8 | 34.9 | 35.3 | 33.8 | 32 |
| Tear | N/m | Test F | 202 | 226 | 257 | 273 | 136 | 130 | 124 | 98 | 162 | 168 | 155 | 168 |
| Tensile | kPa | Test E | 133 | 147 | 159 | 182 | 84 | 98 | 87 | 75 | 113 | 115 | 112 | 100 |
| Elongation | % | Test E | 120 | 113 | 117 | 107 | 107 | 100 | 73 | 73 | 130 | 100 | 100 | 93 |
| Ball Rebound | % | Test H | 62 | 60 | 59 | 60 | 56 | 62 | 60 | 57 | 58 | 60 | 60 | 63 |
| 50% Compression Set | % | Test D | 8 | 7 | 7 | 8 | 7 | 8 | 7 | 8 | 8 | 8 | 6 | 6 |
| 50% Wet Comp Set | % | Test L | 34 | 37 | 33 | 34 | 29 | 32 | 32 | 27 | 30 | 29 | 25 | 23 |
| 50% HACS, 5 hrs @ 120 C. | % | Test J2 | 29 | 32 | 32 | 35 | 28 | 30 | 32 | 33 | 23 | 24 | 25 | 25 |
| 50% HACS, 3 hrs @ 105 C. | % | Test J1 | 16 | 15 | 15 | 16 | 14 | 13 | 15 | 13 | 17 | 16 | 15 | 14 |

TABLE 6-continued

| Property, ASTM D3574-11 | ASTM | SAN | | | | Amorphous Carbon | | | | | | | |
| --- | --- | --- | --- | --- | --- | --- | --- | --- | --- | --- | --- | --- | --- |
| | | | | | | D50 = 0.9 micron | | | | D50 = 0.5 micron | | | |
| % solids | Test | 5 | 10 | 15 | 20 | 5 | 10 | 15 | 20 | 5 | 10 | 15 | 20 |
| IFD 25% | Test B1 | 98 | 117 | 140 | 172 | 99 | 111 | 138 | 174 | 97 | 115 | 141 | 173 |
| 50% | Test B1 | 187 | 225 | 271 | 337 | 183 | 208 | 251 | 311 | 188 | 226 | 274 | 338 |
| % Hysteresis Loss | | 23.8 | 26.2 | 28.9 | 32.1 | 23.3 | 24.7 | 26.2 | 29.7 | 23.1 | 24.1 | 25.6 | 28.9 |
| Density kg/m$^3$ | Test A | 35.3 | 34.7 | 33.8 | 34.6 | 33.4 | 33.4 | 33.1 | 31.8 | 33.2 | 33.5 | 32.8 | 33.1 |
| Tear N/m | Test F | 202 | 226 | 257 | 273 | 158 | 177 | 186 | 190 | 188 | 194 | 202 | 218 |
| Tensile kPa | Test E | 133 | 147 | 159 | 182 | 124 | 114 | 116 | 99 | 124 | 136 | 138 | 144 |
| Elongation % | Test E | 120 | 113 | 117 | 107 | 124 | 110 | 100 | 83 | 125 | 115 | 110 | 100 |
| Ball Rebound % | Test H | 62 | 60 | 59 | 60 | 60 | 62 | 62 | 61 | 62 | 62 | 61 | 61 |
| 50% Compression Set % | Test D | 8 | 7 | 7 | 8 | 7 | 8 | 7 | 6 | 7 | 7 | 7 | 6 |
| 50% Wet Comp Set % | Test L | 34 | 37 | 33 | 34 | 29 | 30 | 24 | 24 | 26 | 28 | 24 | 23 |
| 50% HACS, 5 hrs @ 120 C. % | Test J2 | 29 | 32 | 32 | 35 | 23 | 26 | 28 | 30 | 22 | 26 | 26 | 28 |
| 50% HACS, 3 hrs @ 105 C. % | Test J1 | 16 | 15 | 15 | 16 | 10 | 11 | 10 | 9 | 9 | 10 | 9 | 9 |

TABLE 7

| Formulation | Control | Example | | | | |
| --- | --- | --- | --- | --- | --- | --- |
| | | 2 | 3 | 4 | 5 | 6 |
| E-866 | 63.1 | 49.0 | 49.0 | 49.0 | 57.9 | 57.9 |
| E-850 | 36.9 | 24.6 | 24.6 | 24.6 | 24.5 | 24.6 |
| Amorphous Carbon Dispersion (20%) | 0.0 | 26.4 | 26.4 | 26.4 | 0.0 | 0.0 |
| Amorphous Carbon Dispersion (30%) | 0.0 | 0.0 | 0.0 | 0.0 | 17.6 | 17.6 |
| Water | 2.30 | 2.27 | 2.27 | 2.27 | 2.11 | 1.99 |
| DEOA-LF | 1.01 | 1.01 | 1.01 | 1.01 | 1.01 | 1.01 |
| L3165 | 1.1 | 1.1 | 1.1 | 1.1 | 1.1 | 1.1 |
| 33LV | 0.35 | 0.35 | 0.35 | 0.35 | 0.35 | 0.35 |
| FR-2 | 0.24 | 0.24 | 0.24 | 0.24 | 0.24 | 0.24 |
| DC5043 | 0.4 | 0.4 | 0.4 | 0.4 | 0.4 | 0.4 |
| A1 | 0.04 | 0.04 | 0.04 | 0.04 | 0.04 | 0.04 |
| Polycat 77 | 0.25 | 0.25 | 0.25 | 0.25 | 0.25 | 0.25 |
| Total (Resin) | 105.69 | 105.66 | 105.66 | 105.66 | 105.50 | 105.38 |
| SAN % solids | 15.00 | 10.00 | 10.00 | 10.00 | 10.00 | 10.00 |
| Carbonaceous % solids | 0 | 5.00 | 5.00 | 5.0 | 5.00 | 5.00 |
| Total % solids | 15.00 | 15.00 | 15.00 | 15.00 | 15.00 | 15.00 |
| % water | 2.32 | 2.32 | 2.32 | 2.32 | 2.32 | 2.32 |
| Total Amount of Resin Used | 618.4 | 618.4 | 618.5 | 618.4 | 618.4 | 618.3 |
| ISO Req (E445) | 191.4 | 191.4 | 191.3 | 191.4 | 191.4 | 191.5 |
| I/R ratio (100 index) | 0.3095 | 0.3095 | 0.3093 | 0.3095 | 0.3095 | 0.3097 |

TABLE 8

| Property (ASTM D3574-11) | | ASTM Test | Control | Example | | | | |
| --- | --- | --- | --- | --- | --- | --- | --- | --- |
| | | | | 2 | 3 | 4 | 5 | 6 |
| IFD @ 25% deflection | N | Test B1 | 208 | 213 | 211 | 211 | 206 | 198 |
| IFD @ 50% deflection | N | Test B1 | 377 | 383 | 384 | 381 | 372 | 367 |
| IFD @ 65% deflection | N | Test B1 | 583 | 591 | 590 | 584 | 578 | 572 |
| % Hysteresis Loss | | | 23 | 22 | 22 | 22 | 21 | 21 |
| Density | kg/m$^3$ | Test A | 51 | 49 | 50 | 50 | 49 | 49 |
| Tear | N/m | Test F | 240 | 233 | 257 | 204 | 257 | 238 |
| Tensile | kPa | Test E | 162 | 135 | 136 | 118 | 147 | 141 |
| Elongation | % | Test E | 130 | 107 | 117 | 102 | 107 | 112 |
| 50% Compression Set | % | Test D | 6 | 6 | 7 | 6 | 7 | 6 |
| 50% Wet Comp Set | % | Test L | 24 | 17 | 22 | 19 | 24 | 18 |
| 50% HACS, 5 hrs @ 120 C. | % | Test J2 | 24 | 23 | 23 | 24 | 23 | 22 |
| 50% HACS, 3 hrs @ 105 C. | % | Test J1 | 19 | 14 | 15 | 13 | 12 | 12 |

What is claimed is:

1. A foamed isocyanate-based polymer derived from a reaction mixture comprising:
   an isocyanate;
   a polymer polyol composition comprising an amount in parts by weight of styrene-acrylonitrile polymer particles dispersed in a base polyol;
   an amount in parts by weight of a biomass-based carbonaceous particulate material; and
   a blowing agent;
      the foamed isocyanate-based polymer having an Indentation Force Deflection when measured pursuant to ASTM D3574-11 which is within about 13% as that of a reference foam which is prepared from an identical reaction mixture to said reaction mixture used to prepare said foamed isocyanate-based polymer, except that the reaction mixture used to prepare the reference foam is free of biomass-based carbonaceous particulate material and comprises an amount in parts by weight of polymer particles which is equal to the sum of the amount in parts by weight of polymer particles and the amount in parts by weight of biomass-based carbonaceous particulate in said foamed isocyanate-based polymer;
   wherein the biomass-based carbonaceous particulate material has a D50 particle size in the range of from about 0.2 μm to about 6 μm;
   wherein the biomass-based carbonaceous particulate material has a percentage of modern carbon (pMC) greater than about 85% when measured pursuant to ASTM D6866; and
   wherein the biomass-based carbonaceous particulate material comprises an organic carbon content in the range of from about 85% to about 98% when measured by dry combustion using ASTM D4373.

2. The foamed isocyanate-based polymer defined in claim 1, wherein the biomass-based carbonaceous particulate material is dispersed in the base polyol composition prior to formation of the reaction mixture.

3. The foamed isocyanate-based polymer defined in claim 1, wherein the biomass-based carbonaceous particulate material has a D50 particle size in the range of from about 0.3 μm to about 6 μm.

4. The foamed isocyanate-based polymer defined in claim 1, wherein the biomass-based carbonaceous particulate material has a D50 particle size in the range of from about 0.4 μm to about 6 μm.

5. The foamed isocyanate-based polymer defined in claim 1, wherein the biomass-based carbonaceous particulate material has a D50 particle size in the range of from about 0.5 μm to about 6 μm.

6. The foamed isocyanate-based polymer defined in claim 1, wherein the foamed isocyanate-based polymer having an Indentation Force Deflection when measured pursuant to ASTM D3574-11 which is within about 10% as that of the reference foam.

7. The foamed isocyanate-based polymer defined in claim 1, wherein the foamed isocyanate-based polymer having an Indentation Force Deflection when measured pursuant to ASTM D3574-11 which is within about 5% as that of the reference foam.

8. The foamed isocyanate-based polymer defined in claim 1, wherein the biomass-based carbonaceous particulate material comprises a hydrogen to carbon molar ratio in the range of from about 0.35 to about 0.85 when measured by dry combustion using ASTM D4373.

9. The foamed isocyanate-based polymer defined in claim 1, wherein the biomass-based carbonaceous particulate material has a surface area of from about 50 to about 3000 $m^2/g$ when measured by a BET method.

10. The foamed isocyanate-based polymer defined in claim 1, wherein the reaction mixture is substantially completely free of carbonaceous particulate material derived from petroleum sources.

11. A polyurethane foam derived from a reaction mixture comprising:
    an isocyanate;
    a polymer polyol composition comprising an amount in parts by weight of styrene-acrylonitrile polymer particles dispersed in a base polyol;
    an amount in parts by weight of a biomass-based carbonaceous particulate material; and
    a blowing agent;
       the foamed isocyanate-based polymer having an Indentation Force Deflection when measured pursuant to ASTM D3574-11 which is within about 11% as that of a reference foam which is prepared from an identical reaction mixture to said reaction mixture used to prepare said foamed isocyanate-based polymer, except that the reaction mixture used to prepare the reference foam is free of biomass-based carbonaceous particulate material and comprises an amount in parts by weight of polymer particles which is equal to the sum of the amount in parts by weight of polymer particles and the amount in parts by weight of biomass-based carbonaceous particulate in said foamed isocyanate-based polymer;
    wherein the biomass-based carbonaceous particulate material has: (i) a D50 particle size in the range of from about 0.2 μm to about 6 μm, (ii) a percentage modern carbon (pMC) of greater than 85% when determined according to ASTM D6866, and (iii) an organic carbon content in the range of from about 85% to about 98% when measured by dry combustion using ASTM D4373.

12. The polyurethane foam defined in claim 11, wherein the biomass-based carbonaceous particulate material has a percentage modern carbon (pMC) of greater than 95% when determined according to ASTM D6866.

13. The polyurethane foam defined in claim 11, wherein the biomass-based carbonaceous particulate material is dispersed in the base polyol composition prior to formation of the reaction mixture.

14. The polyurethane foam defined in claim 11, wherein the biomass-based carbonaceous particulate material has a D50 particle size in the range of from about 0.5 μm to about 6 μm.

15. The polyurethane foam defined in claim 11, wherein the foamed isocyanate-based polymer having an Indentation Force Deflection when measured pursuant to ASTM D3574-11 which is within about 8% as that of the reference foam.

16. The polyurethane foam defined in claim 11, wherein the foamed isocyanate-based polymer having an Indentation Force Deflection when measured pursuant to ASTM D3574-11 which is within about 5% as that of the reference foam.

17. The polyurethane foam defined in claim 11, wherein the biomass-based carbonaceous particulate material comprises a hydrogen to carbon molar ratio in the range of from about 0.35 to about 0.85 when measured by dry combustion using ASTM D4373.

18. The polyurethane foam defined in claim 11, wherein the biomass-based carbonaceous particulate material has a surface area of from about 50 to about 3000 $m^2/g$ when measured by a BET method.

19. The foamed isocyanate-based polymer foam defined in claim 1, wherein the foam is an isocyanate-based high resilience (HR) foam.

20. The polyurethane foam defined in claim 11, wherein the foam is a polyurethane high resilience (HR) foam.

\* \* \* \* \*